US011192079B1

(12) United States Patent
Tong et al.

(10) Patent No.: US 11,192,079 B1
(45) Date of Patent: Dec. 7, 2021

(54) AIR-ISOLATED CONTINUOUS FEEDING SYSTEM FOR SYNTHESIZING POLYLACTIC ACID FROM LACTIDE AND FEEDING METHOD THEREOF

(71) Applicants: Nutrition & Health Research Institute, COFCO Corporation, Beijing (CN); COFCO (jilin) Bio-Chemical Technology Co., Ltd, Changchun (CN); Jilin COFCO Biomaterial Co., Ltd, Changchun (CN); COFCO Biotechnology Co., Ltd, Bengbu (CN)

(72) Inventors: Yi Tong, Beijing (CN); Yi Li, Beijing (CN); Fang Tian, Beijing (CN); Bo Chen, Beijing (CN); Tai An, Beijing (CN); Lida Wu, Changchun (CN)

(73) Assignees: Nutrition & Health Research Institute, COFCO Corporation, Beijing (CN); COFCO (jilin) Bio-Chemical Technology CO., Ltd, Changchun (CN); Jilin COFCO Biomaterial Co., Ltd, Changchun (CN); COFCO Biotechnology Co., Ltd., Bengdu (CN)

( * ) Notice: Subject to any disclaimer, the term of this patent is extended or adjusted under 35 U.S.C. 154(b) by 0 days.

(21) Appl. No.: 17/137,268

(22) Filed: Dec. 29, 2020

(30) Foreign Application Priority Data

Jun. 8, 2020 (CN) .......................... 202010509990.7

(51) Int. Cl.
*C08G 63/08* (2006.01)
*B01J 4/00* (2006.01)
(52) U.S. Cl.
CPC .............. *B01J 4/007* (2013.01); *C08G 63/08* (2013.01)

(58) Field of Classification Search
CPC ........ C08G 63/08; C08G 63/82; C08G 63/78; A23C 9/123; B01D 1/16
See application file for complete search history.

(56) References Cited

U.S. PATENT DOCUMENTS

2012/0101248 A1* 4/2012 Matsuba .............. B01J 19/1818
528/272

FOREIGN PATENT DOCUMENTS

| CN | 1101325 A | 4/1995 |
|---|---|---|
| CN | 101353417 B | 8/2011 |
| CN | 105694017 A | 6/2016 |
| CN | 105348499 B | 7/2017 |
| CN | 109280156 A | 1/2019 |
| CN | 110606838 A | 12/2019 |
| CN | 210022060 U | 2/2020 |
| EP | 0628343 | * 12/1994 |

* cited by examiner

*Primary Examiner* — Gregory Listvoyb
(74) *Attorney, Agent, or Firm* — Volpe Koenig

(57) ABSTRACT

The present invention relates to the field of high polymer material manufacturing, and discloses an air-isolated continuous feeding system for synthesizing polylactic acid from lactide and a feeding method thereof. The continuous feeding system comprises a raw material bag/box and a raw material collector for collecting and outputting lactide, the raw material bag/box is connected with a shielding gas input pipeline, a discharge pipe is movably inserted into the raw material bag/box, a cyclone separator is connected downstream of the discharge pipe, and a solid substance outlet of the cyclone separator is connected with the raw material collector. According to the invention, deterioration of the lactide raw material incurred by moisture absorption and oxidation is avoided, and the reaction conversion ratio and final product purity are improved. The continuous feeding system is easy to operate, can save manpower and material resources, and is applicable to industrial application.

9 Claims, 1 Drawing Sheet

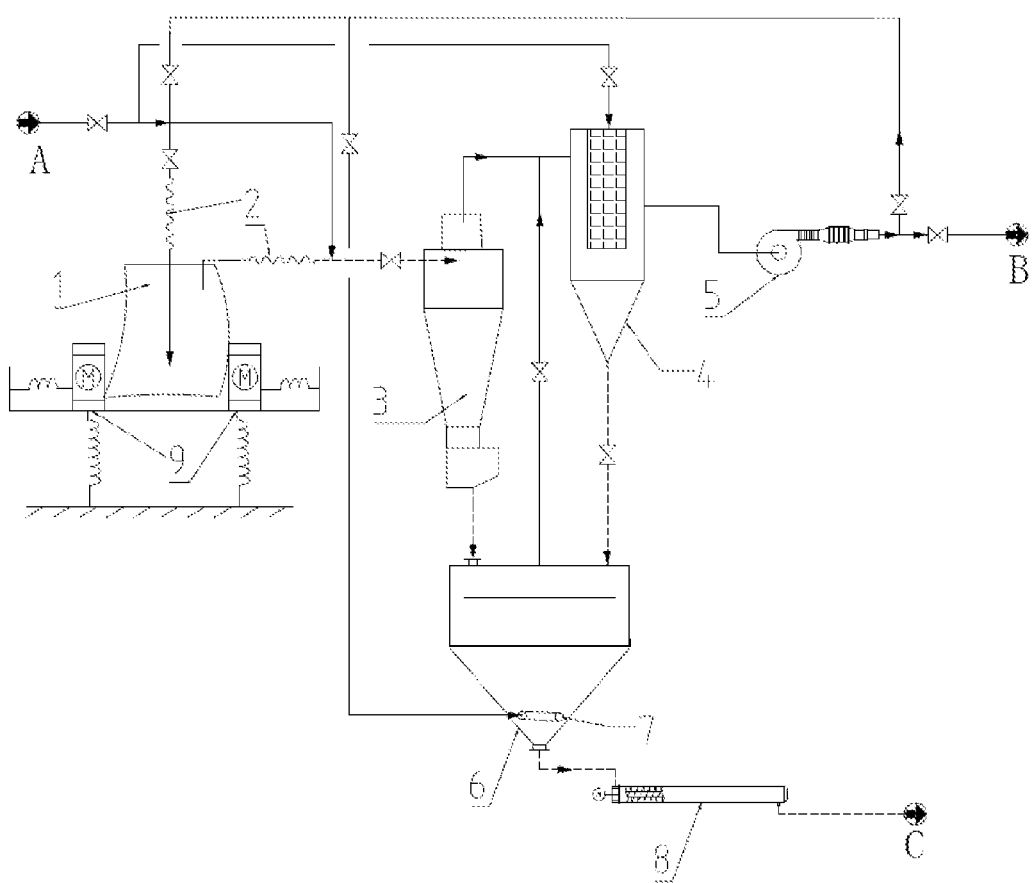

AIR-ISOLATED CONTINUOUS FEEDING SYSTEM FOR SYNTHESIZING POLYLACTIC ACID FROM LACTIDE AND FEEDING METHOD THEREOF

PRIORITY CLAIM & CROSS REFERENCE

This application claims priority to Chinese Application No. 202010509990.7, filed on Jun. 8, 2020, entitled "Air-Isolated Continuous Feeding System for Synthesizing Polylactic Acid from Lactide and Feeding Method Thereof", which is specifically and entirely incorporated by reference.

FIELD OF THE INVENTION

The present invention relates to the technical field of high polymer material manufacturing, in particular to an air-isolated continuous feeding system for synthesizing polylactic acid from lactide and a feeding method thereof.

BACKGROUND

Polylactic acid (PLA) is an environmentally-friendly high polymer material with good biocompatibility and biodegradability, which can be completely degraded into water and carbon dioxide without pollution. Its raw material is lactic acid, which can be obtained through fermentation of grain crops and biological fibers. The development and application of polylactic acid can reduce white pollution of waste polymer materials to the environment and save oil resources. As the research on polylactic acid is deepened, presently, PLA products have been widely applied in medical, packaging material, textile, daily necessities, and industrial product domains, etc. At present, PLA with high relative molecular weight is usually synthesized through a lactide ring-opening polymerization process, which has good controllability and achieves stable product quality. Patents related with engineering application of ring-opening synthesis of polylactic acid from lactide mostly focus on equipment, such as CN105348499B, CN101353417B, CN109280156A, CN105694017A and CN110606838A, etc., but there are few patents related with air-contactless lactide feeding system at present.

In the process of ring-opening synthesis of polylactic acid from lactide, lactide must be fed into the reactor under a condition of strict isolation from air and moisture; otherwise lactide will be degenerated and the reaction conversion ratio and product purity will be degraded. Furthermore, a large quantity of degenerated and useless waste material existing in the system not only causes material waste but also brings great difficulties to the subsequent monomer separation procedure. Consequently, the overall operation becomes complex and the production cost is increased. However, owing to the fact that lactide is packed in boxes or bags, the manual unloading and feeding operations can't be performed strictly in an isolated state, and it is inevitable that some air and moisture enters into the lactide.

It is urgent task to realize continuous material feeding in a state of isolation from air and moisture, so as to ensure the purity of lactide while avoiding raw material loss and reducing useless waste in the system.

SUMMARY

To solve the problems of lactide degeneration, low reaction conversion ratio and low product purity in the existing production process in the prior art, the present invention provides an air-isolated continuous feeding system for synthesizing polylactic acid from lactide and feeding method thereof. The air-isolated continuous feeding system and feeding method can continuously feed the raw material in a state of isolation from air and moisture, employs an shielding gas as propulsion power and a protective agent, thus avoid deterioration of lactide raw material resulted from moisture absorption and oxidation, and improve reaction conversion ratio and final product purity. Specifically, in the present invention, the reaction conversion ratio is as high as 97%, and the monomer content in the final product can be reduced to 0.7-2.0%. In addition, the continuous feeding system provided by the present invention is easy to operate and can save manpower and material resources, and is a continuous feeding system applicable to industrial application.

To attain the above object, in a first aspect, the present invention provides an air-isolated continuous feeding system for synthesizing polylactic acid from lactide, which comprises a raw material bag/box and a raw material collector for collecting and outputting lactide, wherein the raw material bag/box is connected with an shielding gas input pipeline, a discharge pipe is movably inserted into the raw material bag/box, a cyclone separator is connected downstream of the discharge pipe, and a solid substance outlet of the cyclone separator is connected with the raw material collector.

Preferably, a gaseous substance outlet of the cyclone separator is connected with a filter, and a solid substance of the filter is connected with the raw material collector.

Preferably, a blower is arranged at the gaseous substance outlet of the filter, and the outlet of the blower comprises two branches, wherein one branch is connected with the shielding gas input pipeline, and the other branch is connected with an air separation station arranged outside the air-isolated continuous feeding system for synthesizing polylactic acid from lactide.

Preferably, a gas distributor for loosening the solid substance contained in the raw material collector is provided in the raw material collector, and the gas distributor is directly connected with the shielding gas input pipeline.

Preferably, an outlet of the raw material collector is connected with a screw conveyor, and an outlet of the screw conveyor is connected with a reaction system arranged outside the air-isolated continuous feeding system for synthesizing polylactic acid from lactide.

Preferably, the shielding gas input pipeline is directly connected with the filter.

Preferably, the shielding gas is nitrogen, argon or helium.

Preferably, a vibration squeezing crusher for fully breaking and dispersing the agglomerated lactide raw material is provided outside the raw material bag/box.

In a second aspect, the present invention provides a feeding method of the air-isolated continuous feeding system for synthesizing polylactic acid from lactide as described above, which comprises the following steps:

step 100: introducing dry shielding gas into an enclosed space containing lactide raw material to enable the lactide raw material and the dry shielding gas to form a gas-solid mixture, and pneumatically outputting the lactide raw material by means of the shielding gas;

step 200: performing gas-solid separation for the outputted gas-solid mixture, and collecting the separated lactide raw material and outputting it to an external reaction system.

Preferably, the volume fraction of water in the dry shielding gas in the step 100 is 15 ppm or lower; and the volume fraction of oxygen in the dry shielding gas is 50 ppm or lower.

Preferably, the method further comprises the following step before the step 100: when the continuous feeding system is used for the first time, purging and replacing the residual air in the entire continuous feeding system with the dry shielding gas till the volume fraction of the shielding gas in the entire continuous feeding system exceeds 99%.

Preferably, the method further comprises the following step before the step 100: fully squeezing and vibrating the lactide raw material to fully break up and disperse agglomerated lactide raw material in the raw material package.

Preferably, the duration of the squeezing and vibrating treatment of the material is 5-30 min., preferably is 5-20 min.

Preferably, the step 200 further comprises: filtering the gas outputted after gas-solid separation, and collecting the filtered solid lactide raw material; returning a part of the shielding gas in the filtered gas to the enclosed space containing the lactide raw material in the step 100, so that the shielding gas is recycled and reused in the air-isolated continuous feeding system for synthesizing polylactic acid from lactide; and outputting the remaining part of the shielding gas for separate recovery.

Preferably, the ratio of the part of shielding gas that is recycled and reused to the remaining part of shielding gas that is outputted to the air separation station for recovery is 5:1-1:2, preferably is 4:1-1:1.

Preferably, the collected lactide raw material is purged with the shielding gas periodically; the frequency of the periodical purging with the shielding gas is once after each batch of feeding is completed; the batch is feeding of 4-6 sealed packages of lactide raw material.

Preferably, the step 200 further comprises: blowing the collected solid lactide raw material with the shielding gas for loosening, wherein the duration of blowing for loosening is 5-30 min., preferably is 5-20 min.

Preferably, the environment temperature for the feeding is 20-35° C.

With the above technical scheme, continuous feeding is carried out under the condition of isolation from air and moisture, nitrogen is used as propulsion power and a protective agent, so that deterioration of the lactide raw material incurred by moisture absorption and oxidation is avoided, and the reaction conversion ratio and final product purity are improved. Specifically, the reaction conversion ratio can be as high as 97%, and the monomer content in the final product can be reduced to 0.7-2.0%. In addition, the continuous feeding system provided by the present invention is easy to operate and can save manpower and material resources, and is a continuous feeding system applicable to industrial application.

BRIEF DESCRIPTION OF DRAWINGS

FIG. 1 is a schematic diagram of the overall structure of an embodiment of the air-isolated continuous feeding system for synthesizing polylactic acid from lactide in the present invention.

REFERENCE NUMBERS

1—raw material bag/box; 2—connecting hose; 3—cyclone separator; 4—filter; 5—blower; 6—raw material collector; 7—gas distributor; 8—screw conveyor; 9—vibration squeezing crusher; A—shielding gas input pipeline; B—air separation station; C—reaction system.

DETAILED DESCRIPTION

Hereunder some embodiments of the present invention will be detailed with reference to the accompanying drawings. It should be understood that the embodiments described herein are only provided to describe and explain the present invention rather than constitute any limitation to the present invention.

In the present invention, unless otherwise specified, the terms that denote the orientations are used as follows, for example: "top", "bottom", "left" and "right" usually refer to "top", "bottom", "left" and "right" as shown in the accompanying drawings; "inside" and "outside" usually refer to inside and outside in relation to the profiles of the components; and "distal" and "proximal" usually refer to distal and proximal positions with respect to the outlines of the components.

As shown in FIG. 1, the present invention provides an air-isolated continuous feeding system for synthesizing polylactic acid from lactide, which comprises a raw material bag/box 1 and a raw material collector 6 for collecting and outputting lactide, wherein the raw material bag/box 1 is connected with an shielding gas input pipeline A, a discharge pipe is movably inserted into the raw material bag/box 1, a cyclone separator 3 is connected downstream of the discharge pipe, and a solid substance outlet of the cyclone separator 3 is connected with the raw material collector 6. To facilitate movement, both the shielding gas input pipeline A and the discharge pipe may employ a connecting hose 2 respectively. The specific material of the shielding gas input pipeline A and the discharge pipe may be selected according to the actual requirement in the actual application. That is to say, in the present invention, a dry shielding gas is introduced into the enclosed space of the raw material bag/box 1 containing lactide raw material through the shielding gas input pipeline A, so that the lactide raw material and the dry shielding gas form a gas-solid mixture, the lactide raw material is pneumatically outputted by means of the shielding gas, the outputted gas-solid mixture is subjected to gas-solid separation by the cyclone separator 3, and the separated lactide raw material is collected in the raw material collector 6. It is be seen from the above description: in the present invention, the raw material is fed continuously in a state of isolation from air and moisture, an shielding gas is used as propulsion power and a protective agent; thus, high reaction conversion ratio and high final product purity are achieved, the loss is reduced, manpower and material resources are saved. In actual applications, nitrogen is usually used as the shielding gas.

In order to reduce the loss of the lactide raw material, a small amount of solid substance mixed in the gaseous substance separated by the cyclone separator 3 is further separated and collected. The gaseous substance outlet of the cyclone separator 3 is connected with a filter 4, and the solid substance outlet of the filter 4 is connected with the raw material collector 6. In this embodiment, the filter 4 is a bag filter in order to collect the gaseous substance separated from the cyclone separator 3 conveniently. In the actual application, the shape and structure of the filter 4 may be selected as required. In order to keep the lactide raw material isolated from air and moisture all the time, the shielding gas input pipeline A is directly connected with the filter 4 to facilitate purging the material in the filter 4.

A blower 5 is provided at the gaseous substance outlet of the filter 4 to make the gas used as conveying power circulate in the air-isolated continuous feeding system for synthesizing polylactic acid from lactide and improve the fluidity of the gas in the circulation process. The outlet of the blower 5 comprises two branches, wherein one branch is connected with the shielding gas input pipeline A and the other branch is connected to an air separation station B arranged outside the air-isolated continuous feeding system for synthesizing polylactic acid from lactide. That is to say, the gas outputted after gas-solid separation in the cyclone separator 3 enters the filter 4 again for filtering, and the filtered solid lactide raw material is collected in the raw material collector 6; a part of the shielding gas in the filtered gas is returned to the shielding gas input pipeline A and conveyed again to the raw material bag/box 1, so that the shielding gas is recycled and reused in the air-isolated continuous feeding system for synthesizing polylactic acid from lactide; the remaining part of the shielding gas is outputted for separate recovery. For example, in an embodiment of the present invention, the remaining part of the shielding gas is outputted to the air separation station B for recovery. The two parts of shielding gas are allocated at a certain ratio.

To prevent the lactide raw material collected in the raw material collector 6 from coalescence and agglomeration, a gas distributor 7 for loosening the solid substance contained in the raw material collector 6 is provided in the raw material collector 6, and the gas distributor 7 is directly connected with the shielding gas input pipeline A, so as to loosen the collected lactide with the shielding gas.

To facilitate transfer, an outlet of the raw material collector 6 is connected with a screw conveyor 8, and an outlet of the screw conveyor 8 is connected with a reaction system C arranged outside the air-isolated continuous feeding system for synthesizing polylactic acid from lactide.

Usually, the shielding gas may be nitrogen, argon or helium. For the sake of cost and operation convenience, nitrogen is used in this embodiment.

In addition, the structure of the raw material bag/box 1 may be in different forms according to the actual requirement. For example, the raw material bag/box 1 may be an enclosed box or bag. In this embodiment, the raw material bag/box 1 is an enclosed box. Since the lactide raw material may be packed in boxes or bags, the nitrogen pipeline and the lactide discharge pipe may be connected with hoses. In view that it is more convenient to move connecting hoses, pneumatic conveying of the lactide raw material can be realized by inserting a connecting hose into the packing box or packing bag of the lactide raw material, regardless of the packaging structure. Furthermore, a vibration squeezing crusher 9 may be provided outside the raw material bag/box 1 to prevent the lactide raw material from being affected by moisture and agglomerating in the raw material package, which may adversely affect the material feeding. Before the feeding process is commenced, the lactide raw material affected by moisture and agglomerated is intensively squeezed and vibrated to fully break up the lactide raw material agglomerated in the raw material package.

As shown in FIG. 1, in a second aspect, the present invention provides a feeding method of the air-isolated continuous feeding system for synthesizing polylactic acid from lactide as described above, which comprises the following steps:

step 100: introducing dry shielding gas into an enclosed space containing lactide raw material to enable the lactide raw material and the dry shielding gas to form a gas-solid mixture, and pneumatically outputting the lactide raw material by means of the shielding gas;

step 200: performing gas-solid separation for the outputted gas-solid mixture, collecting the separated lactide raw material and outputting it to an external reaction system.

The volume fraction of water in the dry shielding gas in the step 100 is 15 ppm or lower; and the volume fraction of oxygen in the dry shielding gas is 50 ppm or lower.

In order to ensure that the lactide raw material is always isolated from air and moisture, the method further comprises the following step before the step 100: when the continuous feeding system is used for the first time, purging and replacing the residual air in the entire air-isolated continuous feeding system for synthesizing polylactic acid from lactide with the dry shielding gas till the volume fraction of the shielding gas in the entire continuous feeding system exceeds 99%.

In order to prevent the raw material package of lactide from being affected by moisture and caking, which may affect the material feeding adversely, the method further comprises the following step before the step 100: fully squeezing and vibrating the lactide raw material to fully break up and disperse agglomerated lactide raw material in the raw material package. The duration of the squeezing and vibrating treatment of the material is 5-30 min., preferably is 5-20 min.

In order to save energy and reuse the shielding gas in the entire feeding system, the shielding gas is circulated in the air-isolated continuous feeding system for synthesizing polylactic acid from lactide. Specifically, the step 200 further comprises: filtering the gas outputted after gas-solid separation, and collecting the filtered solid lactide raw material; returning a part of the shielding gas filtered to the enclosed space containing the lactide raw material in the step 100, so that the shielding gas is recycled and reused in the air-isolated continuous feeding system for synthesizing polylactic acid from lactide; outputting the remaining part of the shielding gas filtered for separate recovery, for example, in an air separation station. More specifically, the ratio of the part of shielding gas that is recycled and reused to the remaining part of shielding gas that is outputted to the air separation station for recovery is 5:1-1:2, preferably is 4:1-1:1.

The collected lactide raw material must be purged with the shielding gas periodically; the frequency of the periodical purging with the shielding gas is once after each batch of feeding is completed; the batch is feeding of 4-6 sealed packages of lactide raw material.

In addition, in order to prevent the collected lactide raw materials from agglomeration, which may affect the transportation of the solid material, the step 200 further comprises: blowing the collected solid lactide raw material with the shielding gas for loosening, wherein the duration of blowing for loosening is 5-30 min., preferably is 5-20 min.

Under the condition of complete isolation from air and water, the environment temperature of the air-isolated continuous feeding system for synthesizing polylactic acid from lactide is 20-35° C.

It is seen from the above description: the air-isolated continuous feeding system for synthesizing polylactic acid from lactide provided by the present invention utilizes an shielding gas (e.g., nitrogen) as the propulsion power for conveying the lactide raw material and a protective agent in the conveying process, so as to isolate air and moisture from the system and ensure the purity of lactide. Thus, the reaction conversion ratio and the purity of the final product are improved, raw material loss is avoided, useless waste generated in the system is reduced, and manual operations are reduced manpower and material resources are saved.

As shown in FIG. 1, the specific working process of the air-isolated continuous feeding system for synthesizing polylactic acid from lactide provided by the present invention is as follows:

A sealed raw material bag/box 1 filled with lactide raw material is transported to a raw material processing table and fixed there. In the embodiment shown in FIG. 1, the vibration squeezing crusher 9 mainly comprises a vibration mechanism arranged on the raw material processing table, and the vibration mechanism usually may be a vibration spring. The lactide raw material agglomerated in the raw material package is completed broken up and dispersed by driving the raw material processing table to vibrate up and down in the vertical direction, or vibrate left and right in horizontal direction, or vibrate in up, down, left and right directions in combination. Usually, the vibration squeezing crusher 9 fully squeezes the lactide raw material for 5-30 min., preferably 5-20 min. For example, in this embodiment, the lactide raw material agglomerated in the raw material package can be completely broken up and dispersed by squeezing the material for 10 min. The shielding gas outputted from the shielding gas input pipeline A is fed to the bottom of the raw material bag/box 1 through the movable shielding gas input pipe connected with a connecting hose 2 and is in communication with the interior of the raw material bag/box 1. In this embodiment, the shielding gas is nitrogen. Moreover, one end of movable raw material discharge pipe connected with another connecting hose is also inserted into the raw material bag/box 1 and is in communication with the interior of the raw material bag/box 1, the other end of the raw material discharge pipe communicates with the interior of the cyclone separator 3, and the raw material discharge pipe is provided with a control valve for controlling the open/close of the material discharge pipe. Usually, the inputted nitrogen is dry nitrogen, in which the volume fraction of water is 15 ppm or lower and the volume fraction of oxygen is 50 ppm or lower. In this embodiment, the volume fraction of water is 10 ppm and the volume fraction of oxygen is 40 ppm.

It should be noted: when the system is started for the first time, it is necessary to purge and displace the air in the entire system with fresh and dry nitrogen till the volume fraction of nitrogen in the system exceeds 99%. Then the nitrogen pipe and discharge pipe are inserted into the raw material bag/box 1, and at the same time, the blower 5 is started to pneumatically convey the lactide raw material.

The nitrogen feeding valve on the nitrogen pipe is opened, and the nitrogen drives the lactide to the cyclone separator 3 through the discharge pipe. In the cyclone separator 3, the lactide is separated from the nitrogen and falls to the bottom of the cyclone separator 3, while the nitrogen is outputted from the top of the cyclone separator 3 to the filter 4.

The lactide raw material falling to the bottom of the cyclone separator 3 enters the raw material collector 6 through the bottom discharge port, and then is sent to the reaction system C by the screw conveyor 8. A gas distributor 7 is arranged at the bottom of the raw material collector 6. In case the lactide raw material is jammed, nitrogen may be introduced to loosen up the lactide raw material, so as to ensure smooth conveying of the raw material. Each loosening cycle takes 5-30 min., preferably 5-20 min. For example, in this embodiment, the loosening cycle takes 10 min. In addition, the lactide raw material collected in the raw material collector 6 has to be periodically purged with the shielding gas, and the frequency of the periodical purging with the shielding gas is once after every batch of feeding is completed; wherein, each batch consists of feeding of 4-6 sealed packages of lactide raw material, and the frequency of purging may be selected as required in the actual operation process. In this embodiment, the lactide raw material collected in the raw material collector 6 is periodically purged with nitrogen by means of the gas distributor 7.

The gas outputted after gas-solid separation is filtered by the filter 4, and the filtered solid lactide raw material is collected in the raw material collector 6; a part of the nitrogen gas filtered is returned to the raw material bag/box 1, so that the nitrogen gas is recycled and reused in the air-isolated continuous feeding system for synthesizing polylactic acid from lactide; and the remaining part of nitrogen gas is outputted to the air separation station B for recovery. Usually, the allocation ratio of the part of nitrogen returned to the raw material bag/box 1 to the remaining part of nitrogen outputted to the air separation station B is 5:1-1:2, preferably is 4:1-1:1. In this embodiment, the lactide raw material carried by the nitrogen entering the filter 4 is collected in the filter 4; after the nitrogen is pumped out by the blower 5, 80% volume fraction of nitrogen is returned to the nitrogen pipeline at the raw material bag/box 1 to supplement the fresh nitrogen to pneumatically convey the lactide raw material, while the remaining 20% volume fraction of nitrogen is sent to the air separation station B for regeneration. That is to say, in this embodiment, the allocation ratio of the part of nitrogen returned to the raw material bag/box 1 to the remaining part of nitrogen outputted to the air separation station B is 4:1.

In the above material feeding process, the environment temperature of the air-isolated continuous feeding system for synthesizing polylactic acid from lactide is 20-35° C. For example, in this embodiment, the environment temperature is 25° C.

It is seen from the above-mentioned working process of the air-isolated continuous feeding system for synthesizing polylactic acid from lactide provided by the present invention: in the embodiment shown in FIG. 1, the entire system only requires supplementing a small fraction of fresh nitrogen in operation cycle, while most of the nitrogen can be recycled and reused. Thus, the energy consumption is reduced. Besides, the entire system is enclosed and isolated from air, so as to ensure the purity of the lactide raw material and avoid raw material loss.

After the lactide is fed by the feeding system, the following process is applied to synthesize polylactic acid from lactide, and the entire reaction process of synthesizing polylactic acid is carried out in high vacuum or under nitrogen shielding, specifically including:

(a) Under nitrogen shielding, lactide is fed into a lactide melting tank by means of a screw feeder for melting, so as to obtain molten lactide, wherein the melting temperature is 90-110° C. and the reaction time is 1-1.2 h.

(b) In the presence of a catalyst and an initiator, the molten lactide and a composite stabilizer are kept in a first polymerization reactor to have a first polymerization reaction, so as to obtain a first melt, wherein the reaction temperature is 140-160° C., the pressure is 50-53 kPa, and the reaction time is 3-3.2 h;

(c) The first melt is fed into a second polymerization reactor to have a second polymerization reaction, so as to obtain a second melt, wherein the reaction temperature is 170-200° C., the pressure is 6-6.5 MPa, and the reaction time is 1-1.2 h;

(d) the second melt is fed into a monomer removal reactor for monomer removal at 210-215° C. temperature, 1-1.5 kPa pressure and 5-30 rpm stirring speed for 0.5-0.6 h reaction time;

(e) The polylactic acid melt obtained after the step (d) is treated by water-cooled pelleting, dehydration, crystallization and drying, and finally polylactic acid resin is obtained, wherein the pelleting temperature is 210° C.

The reaction conversion ratio of polylactic acid produced with the feeding system and the feeding method provided by the invention through actual industrial production is as high as 97% or above; the obtained polylactic acid product has good color and luster, and the weight average molecular weight is 130,000-250,000; the content of lactide monomer in the obtained polylactic acid is 0.7-2.0%; the melt index of the polylactic acid at 190° C. under 2.16 kg load is 6-27 g/10 min. Compared with the situation of about 95% reaction conversion ratio and 2-5% monomer content in the prior art, the present invention utilizes an shielding gas as propulsion power and a protective agent so as to isolate air and moisture from the system and avoid deterioration of the lactide raw material incurred by moisture absorption and oxidation, and improve the reaction conversion ratio and the final product purity. Specifically, the reaction conversion ratio is as high as 97%, and the monomer content in the final product is reduced to 0.7-2.0%. Moreover, the present invention can avoid raw material loss, reduce useless waste generated in the system, reduce labor and save manpower and material resources owing to its simple operation, and is a continuous feeding approach applicable to industrial application.

While the present invention is described above in detail in some preferred embodiments with reference to the accompanying drawings, the present invention is not limited to those embodiments. Within the scope of the technical concept of the present invention, various simple modifications may be made to the technical scheme of the present invention. For example, the raw material box may be replaced with a lactide raw material bag or a closed container in a different shape. To avoid unnecessary repetition, the possible combinations are not described specifically in the present invention. However, such simple variations and combinations shall also be deemed as having been disclosed and falling in the scope of protection of the present invention.

What is claimed is:

1. A feeding method of an air-isolated continuous feeding system for synthesizing polylactic acid from lactide, the air-isolated continuous feeding system comprising a raw material bag/box and a raw material collector for collecting and outputting lactide, wherein the raw material bag/box is connected with a shielding gas input pipeline A, a discharge pipe is movably inserted into the raw material bag/box, a cyclone separator is connected downstream of the discharge pipe, and a solid substance outlet of the cyclone separator is connected with the raw material collector, the method comprising the following steps:

step 100: introducing dry shielding gas into an enclosed space containing lactide raw material to enable the lactide raw material and the dry shielding gas to form a gas-solid mixture, and pneumatically outputting the lactide raw material by means of the shielding gas;

step 200: performing gas-solid separation for the outputted gas-solid mixture, and collecting the separated lactide raw material and outputting it to an external reaction system; wherein the volume fraction of water in the dry shielding gas in the step 100 is 15 ppm or lower; and the volume fraction of oxygen in the dry shielding gas is 50 ppm or lower.

2. The feeding method of the air-isolated continuous feeding system for synthesizing polylactic acid from lactide of claim 1, further comprising the following step before the step 100: when the continuous feeding system is used for the first time, purging and replacing the residual air in the entire continuous feeding system with the dry shielding gas till the volume fraction of the shielding gas in the entire continuous feeding system exceeds 99%.

3. The feeding method of the air-isolated continuous feeding system for synthesizing polylactic acid from lactide of claim 1, further comprising the following step before the step 100: fully squeezing and vibrating the lactide raw material to fully break up and disperse agglomerated lactide raw material in the raw material package; wherein the duration of the squeezing and vibrating treatment of the material is 5-30 min.

4. The feeding method of the air-isolated continuous feeding system for synthesizing polylactic acid from lactide of claim 3, wherein the duration of the squeezing and vibrating treatment of the material is 5-20 min.

5. The feeding method of the air-isolated continuous feeding system for synthesizing polylactic acid from lactide of claim 1, wherein the step 200 further comprises: filtering the gas outputted after gas-solid separation, and collecting the filtered solid lactide raw material; returning a part of the shielding gas in the filtered gas to the enclosed space containing the lactide raw material in the step 100, so that the shielding gas is recycled and reused in the air-isolated continuous feeding system for synthesizing polylactic acid from lactide; and outputting the remaining part of the shielding gas for separate recovery; wherein the ratio of the part of shielding gas that is recycled and reused to the remaining part of shielding gas that is outputted to the air separation station for recovery is 5:1-1:2.

6. The feeding method of the air-isolated continuous feeding system for synthesizing polylactic acid from lactide of claim 5, wherein the ratio of the part of shielding gas that is recycled and reused to the remaining part of shielding gas that is outputted to the air separation station for recovery is 4:1-1:1.

7. The feeding method of the air-isolated continuous feeding system for synthesizing polylactic acid from lactide of claim 5, wherein the collected lactide raw material is purged with the shielding gas periodically; the frequency of the periodical purging with the shielding gas is once after each batch of feeding is completed; the batch is feeding of 4-6 sealed packages of lactide raw material.

8. The feeding method of the air-isolated continuous feeding system for synthesizing polylactic acid from lactide of claim 1, wherein the step 200 further comprises: blowing the collected solid lactide raw material with the shielding gas for loosening, wherein the duration of blowing for loosening is 5-30 min;

preferably, wherein the duration of blowing for loosening is 5-20 min.

9. The feeding method of the air-isolated continuous feeding system for synthesizing polylactic acid from lactide of claim 1, wherein the environment temperature for the feeding is 20-35° C.

* * * * *